United States Patent [19]
Langhans

[11] Patent Number: 5,684,617
[45] Date of Patent: Nov. 4, 1997

[54] DEVICE FOR TREATING SUBSTRATES, IN PARTICULAR FOR PERFORATING PAPER

[75] Inventor: Lutz Langhans, Starnberg, Germany

[73] Assignee: Carl Baasel Lasertechnik GmbH, Germany

[21] Appl. No.: 616,863

[22] Filed: Mar. 15, 1996

[30] Foreign Application Priority Data

Mar. 28, 1995 [DE] Germany ............... 195 11 393.4

[51] Int. Cl.$^6$ .................................................. G02B 26/08
[52] U.S. Cl. .................... 359/205; 359/17; 359/197; 219/121.7
[58] Field of Search .................................. 359/196–226, 359/558, 565, 566, 569, 15–20, 563; 219/121.6, 121.7–121.8; 131/281

[56] References Cited

U.S. PATENT DOCUMENTS

| 4,265,254 | 5/1981 | Koch et al. ............... 219/121.7 |
| 4,378,480 | 3/1983 | Langhans ............... 359/218 |

FOREIGN PATENT DOCUMENTS

| 624424 | 11/1994 | European Pat. Off. . |
| 2410446 | 6/1979 | France . |
| 2918283 | 3/1981 | Germany . |
| 4328894 | 3/1994 | Germany . |
| 94/29069 | 12/1994 | WIPO . |

*Primary Examiner*—James Phan
*Attorney, Agent, or Firm*—Andrus, Sceales, Starke & Sawall

[57] ABSTRACT

In a device for perforating cigarette paper strips, a row of adjacent optical elements (28) is disposed in the ray path of a laser beam deflected by a rotating mirror (12). Each of the optical elements includes a diffractive optical element (DOE) (24'; 24"; 24"') and a convergent lens (18'; 18"; 18"'). A parallel bundle of laser rays hits the surface of the DOE, and the DOE emits one or more bundles of rays with a desired configuration. The convergent lens produces therefrom in the plane of the cigarette paper strip (20) one or more focal spots, for example two or four mutually offset focal spots (22a, 22b) or a ring focus, so that one can form not only microperforations by individual focal spots but also macroperforations by applying energy to only the peripheral area of a macroperforation rather than the entire perforation area.

3 Claims, 2 Drawing Sheets

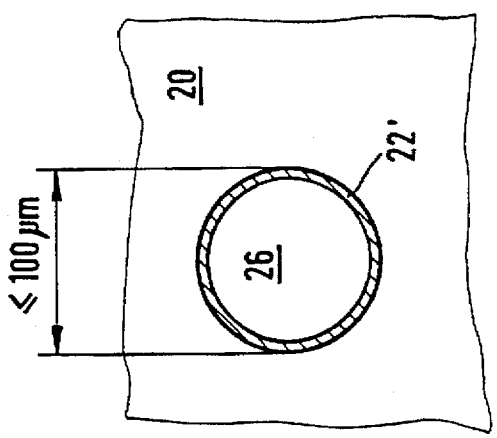
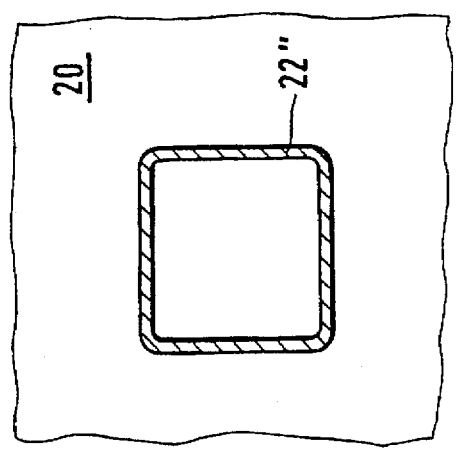
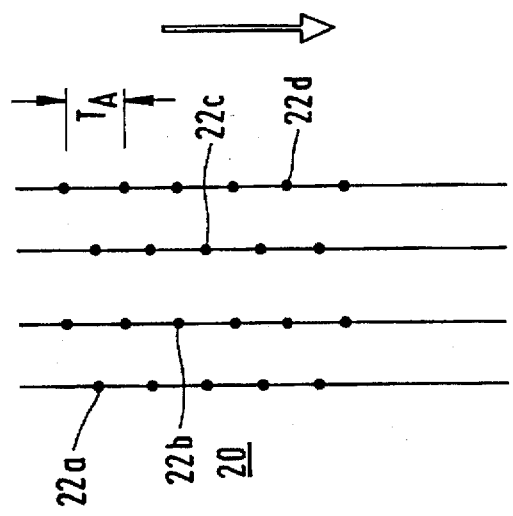
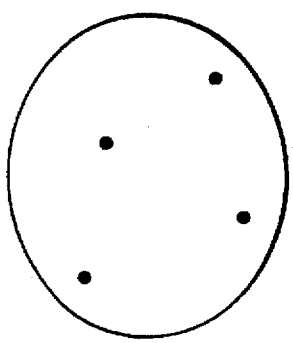
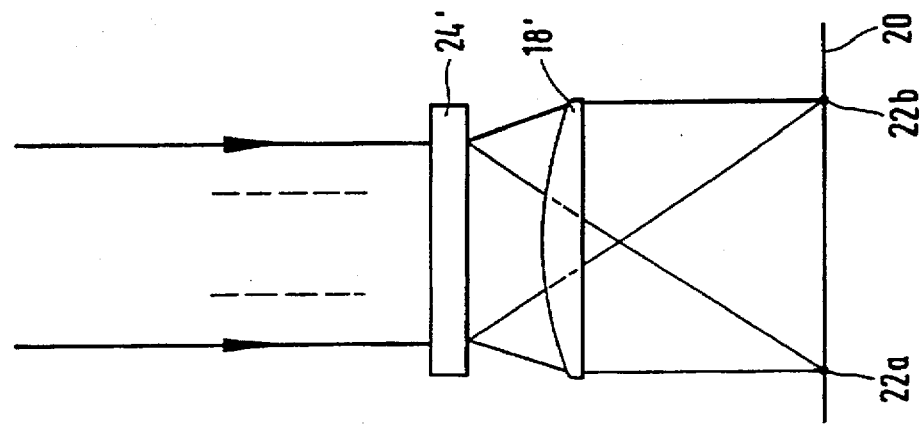

DEVICE FOR TREATING SUBSTRATES, IN PARTICULAR FOR PERFORATING PAPER

BACKGROUND OF THE INVENTION

This invention relates to a device for treating substrates, in particular for perforating paper, having a laser and a deviating unit for guiding the laser beam over a row of optical elements located in the beam sweep path, each focusing the impinging laser beam on one or more focal spots in the substrate surface.

Such a device is known from DE-A-29 18 283. The known device is specifically intended for perforating cigarette paper. Perforation of cigarette paper can influence the nicotine and condensate values of the cigarettes, among other things. Before being treated further the paper wound on spools is perforated continuously by a device of the type in question. By suitably designing the device one can produce four, eight and more perforated tracks in a paper strip simultaneously.

Specifically for simultaneous or quasi-simultaneous production of several perforated tracks in the paper, a plurality of convergent lenses are disposed side by side in the beam sweep path of the deviating unit formed as a rotating mirror. The laser light is focused on the rotating mirror by a first lens, and the reflected light passes onto the paper strip via a further row of convergent lenses and the abovementioned convergent lenses. Each of the convergent lenses disposed in a row before the paper strip produces one hole at one full laser beam angle sweep.

Depending on the amount of energy impinging on a spot and the adjustment of the focus, a microperforation, i.e. a perforation with a diameter of less than about 100 microns, or a macroperforation, i.e. a perforation with a diameter of more than about 100 microns, is formed at an impact point of the laser beam.

With the known device a parallel bundle of rays is produced by the two mutually associated convergent lenses. One can dispose a prism in this ray path so that two bundles of rays emerge from the prism and two focal spots are produced on the paper strip by the following convergent lens. Only half the light available without the prism can then be used for each focal spot. For uniform division of rays the prism must be centered very exactly.

A special problem with the devices in question is the production of macroperforations, which, as mentioned above, have a diameter of more than 100 microns. The amount of paper to be removed from a paper strip during one perforation is approximately proportional to the energy in the focus of the ray. That is to say, if one doubles the hole diameter of the perforation one must provide approximately four times the radiant energy in the focal plane.

It is difficult, if not impossible, to perforate several rows of apparently random perforations and larger holes with the known device. Special hole shapes such as square or rectangular ones are out of the question.

The invention is based on the problem of providing a device of the abovementioned type wherein the number, arrangement and/or shape of focal spots in the substrate surface can be adjusted at will without great effort.

SUMMARY OF THE INVENTION

This problem is solved according to the invention by giving each optical element a diffractive optical element. Such a diffractive optical element (abbreviated to DOE) selectively exploits the diffraction patterns on fine structures of a grid to obtain a desired intensity distribution in the focal plane. Diffractive optical elements are frequently also referred to as HOEs or BOEs for short.

In a special embodiment of the invention which utilizes especially well the advantages of the device known from DE-A-29 18 283, the invention provides for a row of adjacent convergent lenses being located in the beam sweep path, their distance from the substrate corresponding to the lens focal length, the laser beam being focused by a first lens on the reflecting surface of a rotating mirror, there being located between the rotating mirror and the row of adjacent convergent lenses a further row of associated convergent lenses, their distance from the reflecting surface of the rotating mirror corresponding to their focal length so that they emit parallel bundles of rays, and each of these lenses being preceded by a diffractive optical element. The diffractive optical element (DOE) is preferably equipped with a grid such that it emits at least two bundles of rays, thereby forming two focal spots on the substrate surface. One can also form more focal spots, for example four focal spots, which are each produced by one DOE (in conjunction with a following convergent lens).

By using a DOE or using a row of adjacent diffractive optical elements in paired association with each of the adjacent convergent lenses one can produce simultaneously with each angle sweep of the laser beam a relatively large number of perforations in individual rows of holes in the moving paper strip, if the device is used for perforating cigarette paper.

One can rotate the particular diffractive optical element, which produces two or four or a different number of focal spots in the paper plane, in the desired way so that a number of several parallel rows of holes are formed in the paper strip, the holes in the individual rows being offset mutually in the longitudinal direction of the rows so as to produce a quasi-irregular hole pattern. If these holes formed in particular as microperforations are distributed quasi-irregularly in the stated way they are practically unrecognizable to the naked eye.

As mentioned above, one frequently also requires so-called macroperforations, i.e. perforations with a diameter of more than about 100 microns. When such macroperforations are produced in the usual way the focal spot is adjusted so that its diameter in the surface of the substrate, i.e. in the paper plane, corresponds to the desired hole diameter. One must provide a relatively high amount of energy to be able to burn out the paper completely in the hole area.

The inventive use of a diffractive optical element offers the possibility of producing a ring focus on or in the substrate surface. This ring focus means that only the peripheral area of the desired macroperforation is burned away, the middle area of the perforation falling out of the paper strip because it is no longer connected with the rest of the paper. Alternatively to the ring focus one can also use the diffractive optical element to form a different focus defining a closed curve. In either case one can perforate a paper strip with a relatively low expenditure of energy since one need not burn away the entire surface area of the perforation but only the peripheral area.

BRIEF DESCRIPTION OF THE DRAWINGS

In the following some embodiments of the invention will be explained more closely with reference to the examples.

FIG. 2 shows a schematic view of the ray path in a part of the assembly shown in FIG. 2;

FIG. 3 shows a schematic representation of a rectangular focus in the paper plane;

FIGS. 4a and 4b show a schematic representation of the perforations in a cigarette paper strip and a plan of four focal spots defined by a DOE in conjunction with a convergent lens; and FIG. 5 shows a schematic representation of a ring focus in the plane of a cigarette paper strip.

DETAILED DESCRIPTION OF THE PREFERRED EMBODIMENT

Figure 1:
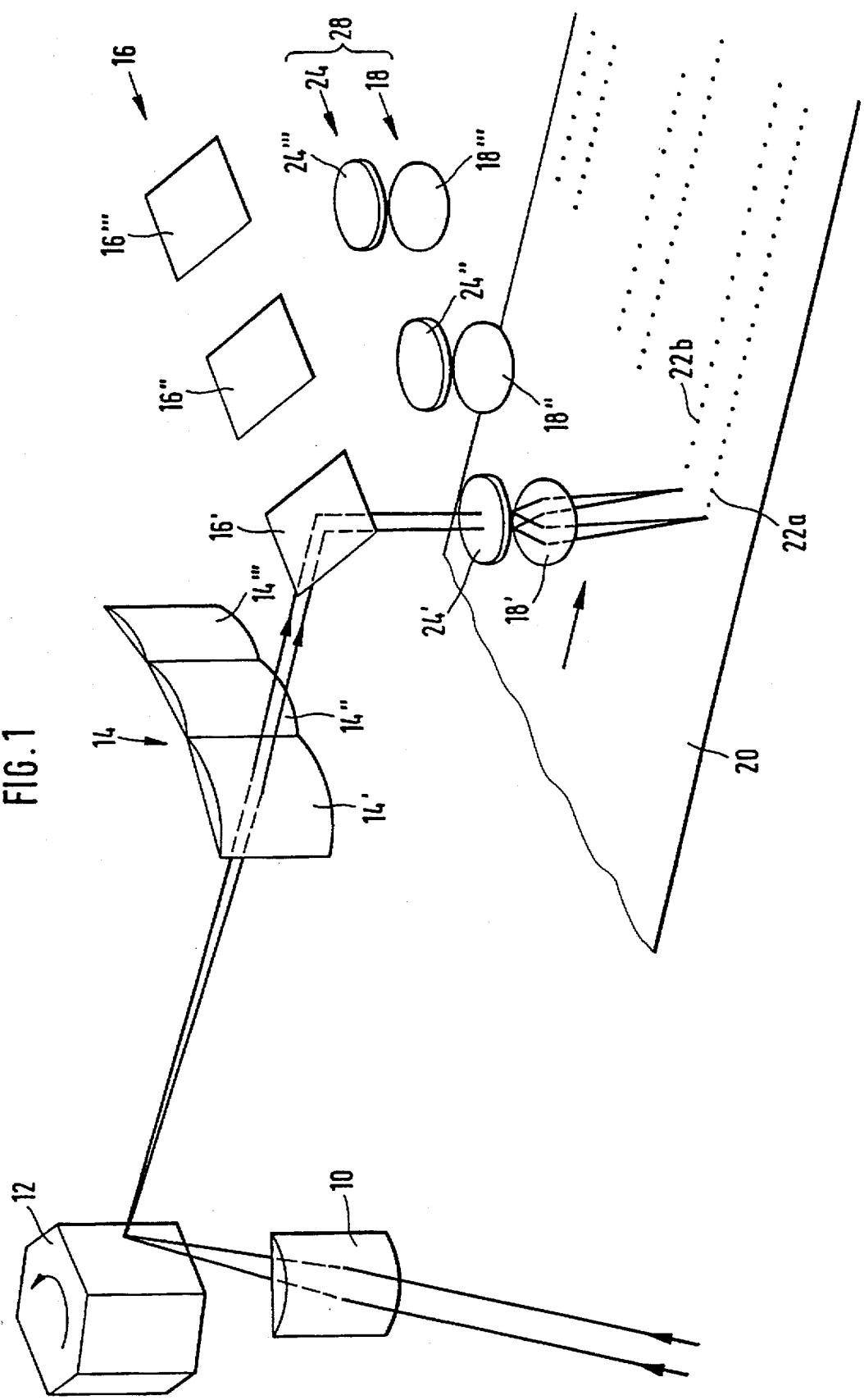
FIG. 1 shows a perspective view of the essential functional elements of a device for perforating paper.

According to FIG. 1 the beam from a laser (not shown) runs through first convergent lens 10 whose focus is on the surface of polygonal rotating mirror 12 disposed in the ray path behind convergent lens 10. The polygonal rotating mirror has six facets.

The laser beam reflected by polygonal rotating mirror 12 covers a certain angle range on each facet. The reflected beam passes onto first lens system 14 consisting of three individual convergent lenses 14', 14", 14'". The convergent lenses all have the same focal length and a position such that their focus or focal plane coincides with the focus or focal plane of convergent lens 10 on polygonal rotating mirror 12. The light leaving lenses 14'to 14'" is therefore of parallel orientation again.

In the embodiment shown, convergent lenses 10 and 14 are formed as cylindrical lenses. This has the advantage that rotating mirror 12 is not burdened as greatly by the high energy density of the laser beam, since cylindrical lenses obviously image a line rather than a point in the focal plane.

The rays of light leaving first lens system 14 are deflected 90° by deviating unit 16 including mirrors 16', 16" and 16'" in the embodiment shown in FIG. 1. Deviating mirrors are necessary in the system shown in FIG. 1 because the paper strip extends—for reasons of design—parallel to the laser beam leaving polygonal rotating mirror 12.

Following deviating unit 16 there is optical assembly 28 including lens system 18 and a system of diffractive optical elements (DOE) 24. Lens system 18 contains individual spherical convergent lenses 18', 18" and 18'". The distance of lens system 18 from paper strip 20 corresponds to the focal length of individual convergent lenses 18', 18'" and 18'". The size of the convergent lenses of lens system 18 corresponds approximately to the size of the lenses of lens system 14.

Convergent lenses 18', 18" and 18'" are preceded by diffractive optical elements 24', 24" and 24'", respectively.

As indicated in FIG. 1, diffractive optical element (DOE) 24'emits a pair of bundles of rays, and each bundle of rays hits convergent lens 18'. The latter produces two perforations 22a, 22b in parallel rows in the plane of paper strip 20.

In FIG. 1 altogether three pairs of rows of perforations are provided on paper strip 20, the individual pairs of rows each being formed by a pair consisting of a diffractive optical element and a convergent lens. The two pairs of elements 24", 18" and 24'", 18'" work in the same way as described above for pair 24', 18'.

When an angle range is covered the bundle of rays leaving lens 14' for example is shifted parallel by a corresponding amount X. Convergent lens 18' must be of a size such that it always focuses the bundle of rays in focal spot 22 over the entire area of its parallel displacement, the ray path of diffractive optical element 24' being taken into account.

FIG. 2 shows the bundle of rays from lens 14' for example, which hits diffractive optical. Element 24' element 24' passes two bundles of rays onto convergent lens 18', which in turn focuses both bundles of rays on two focal spots 22a and 22b in paper strip 20.

FIGS. 4a and 4b illustrate the use of a diffractive optical element which produces from an incident bundle of parallel rays four partial bundles of rays which are focused by the following convergent lens on four focal spots on the paper strip. FIG. 4b shows the distribution of the focal spots; FIG. 4a shows a detail of paper strip 20 moving in the direction of the arrow. The angular position of the DOE is selected in relation to paper strip 20 in such a way that four equidistant rows of perforations are formed. The rate of feed of paper strip 20 is selected so that there is distance $T_A$ between two adjacent perforations in a row. FIG. 4a shows the four focal spots 22a, 22b, 22c and 22d which are produced when the laser beam runs once over a set consisting of convergent lens 14', deviating mirror 16', diffractive optical element 24' and convergent lens 18'.

FIG. 5 shows the case in which the grid of diffractive optical element 24 is structured so that ring focus 22' is formed in the plane of paper strip 20. Ring focus 22' permits the peripheral area of macroperforation 26 to be burned away. The necessary expenditure of energy is relatively low since only the peripheral area is burned away while the paper located in the middle falls out of paper strip 20 because it is no longer connected with the rest of the paper strip. The diameter of macroperforation 26 is more than 100 microns.

Modifications of the described embodiments are possible. Instead of the ring focus shown in FIG. 5, one can also design the grid of DOE 24 so as to form a focus resulting in a square perforation or any other perforation whereby only the 10 peripheral area is burned away by the laser beam. Such a rectangular focus 22" is shown in FIG. 3.

I claim:

1. A device for treating substrates having a laser and a deviating unit (16) for guiding the laser beam over a row of optical elements (28), each of the optical elements (28) focusing the impinging laser beam on one or more focal spots in the substrate surface, characterized in that the optical elements (28) each have a diffractive optical element (24', 24", 24'") collectively forming a diffractive grid with said diffractive optical element forming a ring focus (22'), a rectangular focus (22") or other closed curve focus on the substrate surface.

2. The device of claim 1, characterized in that a row of convergent lenses (18', 18", 18'") is located adjacent said diffractive optical elements (24', 24", 24'") at a distance from the substrate (20) corresponding to the lens focal length, the laser beam is focused by a first lens (10) on the reflecting surface of a rotating mirror (12) serving as a deviating unit, there is located between the rotating mirror and the row of associated convergent lenses (14), their distance from the reflecting surface of the rotating mirror (12) corresponding to their focal length so that these lenses emit parallel bundles of rays, and each of these lenses is followed by a diffractive optical element (24', 24", 24'").

3. The device of claim 2, characterized in that the grid of the diffractive optical element (24', 24", 24'") is formed in such a way that it emits at least two bundles of rays so as to form at least two focal spots on the substrate surface.

* * * * *

UNITED STATES PATENT AND TRADEMARK OFFICE
CERTIFICATE OF CORRECTION

PATENT NO. :  5,684,617
DATED      :  November 4, 1997
INVENTOR(S) :  Langhans

It is certified that error appears in the above-indentified patent and that said Letters Patent is hereby corrected as shown below:

CLAIM 2, Col. 4, Line 55, after "of" insert ---adjacent convergent lenses (18) a further row of---

Signed and Sealed this

Eleventh Day of August 1998

Attest:

Attesting Officer

BRUCE LEHMAN

Commissioner of Patents and Trademarks